(12) United States Patent
Kim et al.

(10) Patent No.: US 10,593,083 B2
(45) Date of Patent: Mar. 17, 2020

(54) METHOD FOR FACIAL AGE SIMULATION BASED ON AGE OF EACH PART AND ENVIRONMENTAL FACTORS, RECORDING MEDIUM AND DEVICE FOR PERFORMING THE METHOD

(71) Applicant: KOREA INSTITUTE OF SCIENCE AND TECHNOLOGY, Seoul (KR)

(72) Inventors: Ig Jae Kim, Seoul (KR); Sung Eun Choi, Seoul (KR); Sang Chul Ahn, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/259,645

(22) Filed: Sep. 8, 2016

(65) Prior Publication Data

US 2017/0084069 A1   Mar. 23, 2017

(30) Foreign Application Priority Data

Sep. 22, 2015 (KR) .......................... 10-2015-0133608

(51) Int. Cl.
*G06T 11/60* (2006.01)
*G06T 3/00* (2006.01)

(52) U.S. Cl.
CPC ............ *G06T 11/60* (2013.01); *G06T 3/0093* (2013.01)

(58) Field of Classification Search
None
See application file for complete search history.

(56) References Cited

U.S. PATENT DOCUMENTS

| 6,437,866 B1 * | 8/2002 | Flynn ................... A45D 44/005 |
| | | 356/326 |
| 8,666,770 B2 | 3/2014 | Maes et al. |
| 2006/0274071 A1 | 12/2006 | Bazin |

(Continued)

FOREIGN PATENT DOCUMENTS

| JP | 2008-242963 A | 10/2008 |
| JP | 2015-114946 A | 6/2015 |

(Continued)

OTHER PUBLICATIONS

Dehshibi, Mohammad Mandi, and Azam Bastanfard. "A new algorithm for age recognition from facial images." Signal Processing 90.8 (2010): 2431-2444.*

(Continued)

*Primary Examiner* — Sarah Le
(74) *Attorney, Agent, or Firm* — NSIP Law

(57) ABSTRACT

Disclosed is a method for facial age simulation based on an age of each facial part and environmental factors, which includes: measuring an age of each facial part on the basis of an input face image; designating a personal environmental factor; transforming an age of each facial part by applying an age transformation model according to the age of each facial part and the environmental factor; reconstructing the image transformed for each facial part; and composing the reconstructed images to generate an age-transformed face. Accordingly, it is possible to transform a face realistically based on an age measured for each facial part and an environmental factor.

24 Claims, 4 Drawing Sheets

(56) References Cited

U.S. PATENT DOCUMENTS

2009/0028380 A1* 1/2009 Hillebrand .............. G06T 11/60
382/100
2012/0321144 A1* 12/2012 Choong .................. G06F 21/32
382/118
2014/0099029 A1 4/2014 Savvides et al.
2016/0259967 A1* 9/2016 Kawashimo ............ G09F 27/00

FOREIGN PATENT DOCUMENTS

| KR | 10-2013-0049099 A | 5/2013 |
|----|-------------------|--------|
| KR | 10-1507081 B1 | 4/2015 |
| KR | 10-2015-0061914 A | 6/2015 |
| KR | 10-2015-0089370 A | 8/2015 |

OTHER PUBLICATIONS

A. Lanitis et al., "Toward Automatic Simulation of Aging Effects on Face Images." *IEEE Transactions on Pattern Analysis and Machine Intelligence*, Apr. 2002, vol. 24, No. 4, pp. 442-455.
J. Suo et al., "A Compositional and Dynamic Model for Face Aging." *Journal of Latex Class Files*, Jan. 2009, pp. 1-17.
J. Suo et al., "A Concatenational Graph Evolution Aging Model." *IEEE transactions on pattern analysis and machine intelligence*, Nov. 2012, vol. 34, No. 11, pp. 2083-2096.

\* cited by examiner

METHOD FOR FACIAL AGE SIMULATION BASED ON AGE OF EACH PART AND ENVIRONMENTAL FACTORS, RECORDING MEDIUM AND DEVICE FOR PERFORMING THE METHOD

CROSS-REFERENCE TO RELATED APPLICATION

This application claims priority to Korean Patent Application No. 10-2015-0133608, filed on Sep. 22, 2015, and all the benefits accruing therefrom under 35 U.S.C. § 119, the contents of which in its entirety are herein incorporated by reference.

BACKGROUND

1. Field

The present disclosure relates to a method for facial age simulation based on an age of each facial part and environmental factors, and a recording medium and device for performing the method, and more particularly, to a method for facial age simulation which may obtain a realistic age simulation result by using an age measured from each facial part and personal environment information, and a recording medium and device for performing the method.

2. Description of the Related Art

The research for automatically recognizing an age of a face and transforming into a specific age has been applied in more fields in the real life, and thus there is a growing interest thereon. In particular, the research for transforming an age of a face image into a specific age is frequently used in various fields.

In many existing researches, when it is intended to transform an age of an input image into a desired age, the age of the entire face is set identical to an actual age and then the age is transformed. However, different parts of a face may be aged differently due to environmental factors. For example, when a person works mostly in the open air, the shape of the entire face of the person is transformed suitable for his/her age, but the skin may be aged faster due to the influence of ultraviolet rays.

Thus, the skin may be measured older than his/her age. In addition, when a person cares his/her skin constantly by means of functional cosmetics, skin beauty or the like, the skin may be aged slower in comparison to persons who do not care the skin. As described above, if the age of a face is transformed regardless of personal environmental information and age measured from each facial part, it is difficult to obtain an accurate age transformation result.

SUMMARY

The present disclosure is directed to providing a method for facial age simulation based on an age of each facial part and environmental factors, which may derive an accurate age transformation result.

The present disclosure is also directed to providing a recording medium on which a computer program for executing the method for facial age simulation based on an age of each facial part and environmental factors is recorded.

The present disclosure is also directed to providing a device for executing the method for facial age simulation based on an age of each facial part and environmental factors.

In one aspect of the present disclosure, there is provided a method for facial age simulation based on an age of each facial part and environmental factors, the method comprising: measuring an age of each facial part on the basis of an input face image; designating a personal environmental factor; transforming an age of each facial part by applying an age transformation model according to the age of each facial part and the environmental factor; reconstructing the image transformed for each facial part; and composing the reconstructed images to generate an age-transformed face.

In an embodiment of the present disclosure, the measuring of an age of each facial part on the basis of an input face image may include: dividing an input face image into each facial part; extracting each facial feature from each facial part; and measuring an age from each facial feature.

In an embodiment of the present disclosure, in the measuring of an age from each facial feature, an age may be measured with respect to shape and texture of each facial part (eyes, nose, lips, jaw, forehead, wrinkles, skin and so on).

In an embodiment of the present disclosure, in the extracting of each facial feature from each facial part, each facial feature may be extracted using at least one of a statistical analysis technique, a frequency analysis-based filter and a local binary pattern analysis method.

In an embodiment of the present disclosure, in the transforming of an age of each facial part by applying an age transformation model according to the age of each facial part and the environmental factor, an age may be transformed with respect to shape and texture of each facial part (eyes, nose, lips, jaw, forehead, wrinkles, skin and so on).

In an embodiment of the present disclosure, the composing of the reconstructed images to generate an age-transformed face may include: composing the reconstructed image with respect to a texture of each age-transformed facial part (eyes, nose, lips, jaw, forehead, wrinkles, skin and so on); and coupling the composed image with the age-transformed facial shape for warping.

In an embodiment of the present disclosure, in the designating of a personal environmental factor, at least one of personal health, body type, job, life habit, race and district may be designated.

In an embodiment of the present disclosure, the method for facial age simulation based on an age of each facial part and environmental factors may further include: building a database in which face images are classified according to environmental factors; and training an environmental aging function by using the database.

In an embodiment of the present disclosure, the transforming of an age of each facial part by applying an age transformation model according to the age of each facial part and the environmental factor may use the environmental aging function.

In an embodiment of the present disclosure, the method for facial age simulation based on an age of each facial part and environmental factors may further include comparing an age transformation result generated based on the age of each facial part and the environmental factor with an age transformation result generated based on other environmental factor visually or by using the measured age of each facial part of both results.

In another aspect of the present disclosure, there is provided a computer-readable recording medium, on which a computer program for executing the method for facial age simulation based on an age of each facial part and environmental factors is recorded.

In another aspect of the present disclosure, there is provided a device for facial age simulation based on an age of each facial part and environmental factors, the device comprising: an age measuring unit configured to measure an age of each facial part on the basis of an input face image; an environment selecting unit configured to designate a personal environmental factor; an age transforming unit configured to transform an age of each facial part by applying an age transformation model according to the age of each facial part and the environmental factor; an image reconstructing unit configured to reconstruct the image transformed for each facial part; and a simulation unit configured to compose the reconstructed images to generate an age-transformed face.

In an embodiment of the present disclosure, the age measuring unit may include: a dividing unit configured to divide an input face image into each facial part; a feature extracting unit configured to extract each facial feature from each facial part; and an age estimation unit configured to estimate an age from each facial feature.

In an embodiment of the present disclosure, the age estimation unit may include: a facial shape measuring unit configured to measure an age with respect to a shape of each facial part (eyes, nose, lips, jaw, forehead, wrinkles, skin and so on); and a texture measuring unit configured to measure an age with respect to a texture of each facial part (eyes, nose, lips, jaw, forehead, wrinkles, skin and so on).

In an embodiment of the present disclosure, the feature extracting unit may extract each facial feature by using at least one of a statistical analysis technique, a frequency analysis-based filter and a local binary pattern analysis method.

In an embodiment of the present disclosure, the age estimation unit may use at least one of an age recognizer and a skin measurement sensor.

In an embodiment of the present disclosure, the age transforming unit may transform the age with respect to shape and texture of each facial part (eyes, nose, lips, jaw, forehead, wrinkles, skin and so on).

In an embodiment of the present disclosure, the simulation unit may include: a composing unit configured to compose the reconstructed image with respect to a texture of each age-transformed facial part (eyes, nose, lips, jaw, forehead, wrinkles, skin and so on); and a warping unit configured to couple the composed image with the age-transformed facial shape for warping.

In an embodiment of the present disclosure, the environment selecting unit may designate at least one of personal health, body type, job, life habit, race and district.

In an embodiment of the present disclosure, the device for facial age simulation based on an age of each facial part and environmental factors may further include: a database building unit configured to build a database in which face images are classified according to environmental factors; and a training unit configured to train an environmental aging function by using the database.

In an embodiment of the present disclosure, the age transforming unit may use the environmental aging function.

In an embodiment of the present disclosure, the device for facial age simulation based on an age of each facial part and environmental factors may further include a comparing unit configured to compare a result of the simulation unit with an age transformation result generated based on other environmental factor visually or by using the measured age of each facial part of both results.

According to the method for facial age simulation based on an age of each facial part and environmental factors, a face is divided into various parts and their ages are transformed in detail, thereby transforming the age of the face on the basis of the age measured from each facial part. In addition, the age is transformed using environmental factors differently applied to facial parts.

In the present disclosure, an age of each facial part is measured using a face image, and an age-transformed face is generated based on the measured age. Here, if the measured age of each facial part is different from an actual age, a realistic age transformation result may be obtained in comparison to an existing method.

In addition, in this method, since environmental factors (health, body type, job, life habits or the like) giving an influence on the age transformation process of each facial part are used together, a personalized age transformation result may be obtained.

In the present disclosure, by comparing an age transformation result generated based on an age of each facial part and environmental factor with an age transformation result generated based on other environmental factor visually or by using the measured age of each facial part of both results, it is possible to check personal environmental factors giving an influence on aging of a face and improve the personal environmental factors to inhibit the aging.

DETAILED DESCRIPTION

Figure 1:
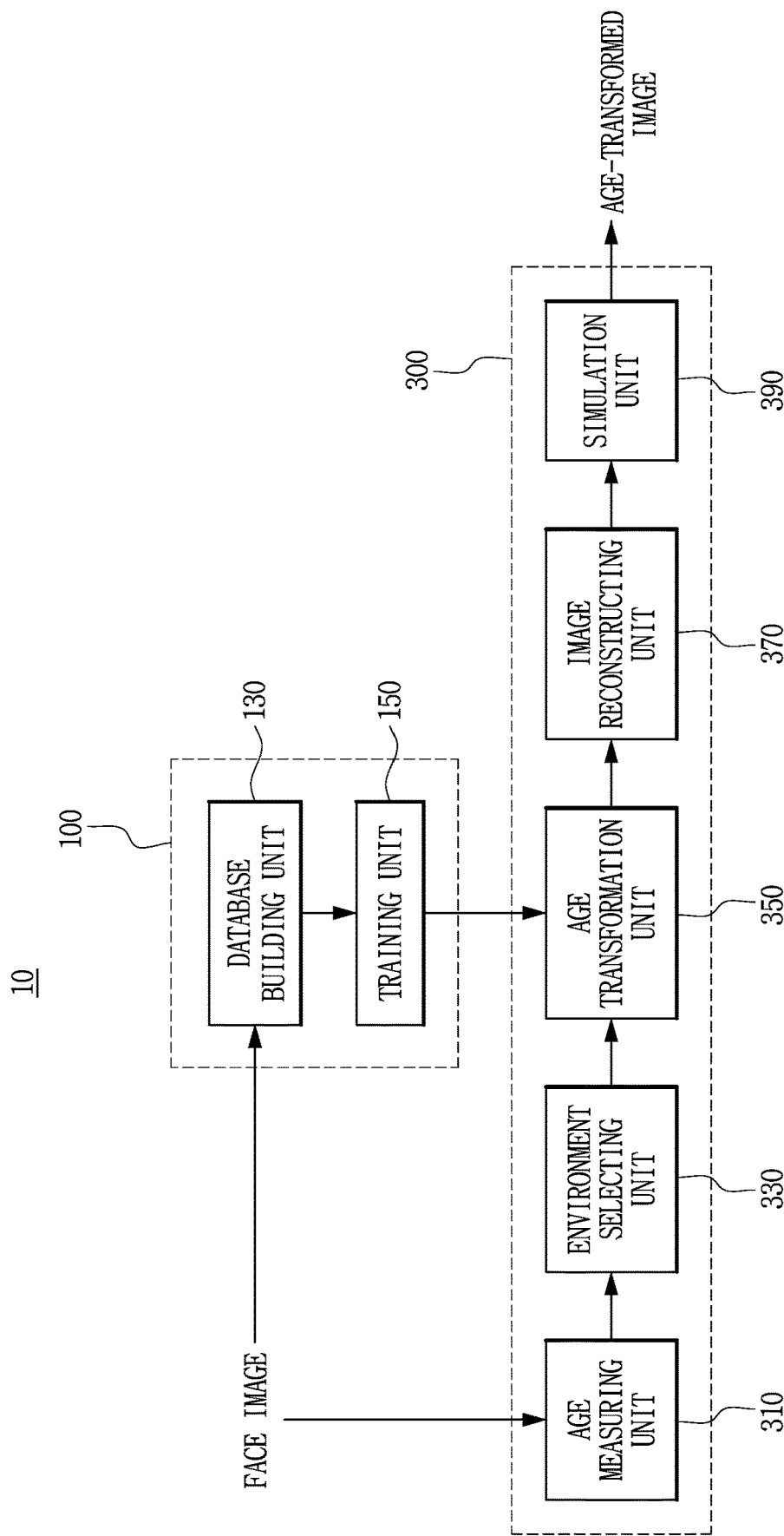
FIG. 1 is a block diagram showing an age simulation device according to an embodiment of the present disclosure.

The following detailed description of the present disclosure refers to the accompanying drawings which show specific embodiments implemented by the present disclosure. These embodiments are described in detail so as to be easily implemented by those skilled in the art. It should be understood that various embodiments of the present disclosure are different from each other but not exclusive from each other. For example, specific shapes, structures and features written herein can be implemented in other embodiments without departing from the scope of the present disclosure. In addition, it should be understood that locations or arrangements of individual components in each embodiment may be changed without departing from the scope of the present disclosure. Therefore, the following detailed description is not directed to limiting the present disclosure, and the scope of the present disclosure is defined just with the appended claims along and their equivalents, if it is suitably explained. In the drawings, like reference numerals denote like elements through several drawings.

Hereinafter, embodiments of the present disclosure will be described in more detail with reference to the accompanying drawings.

Figure 2:
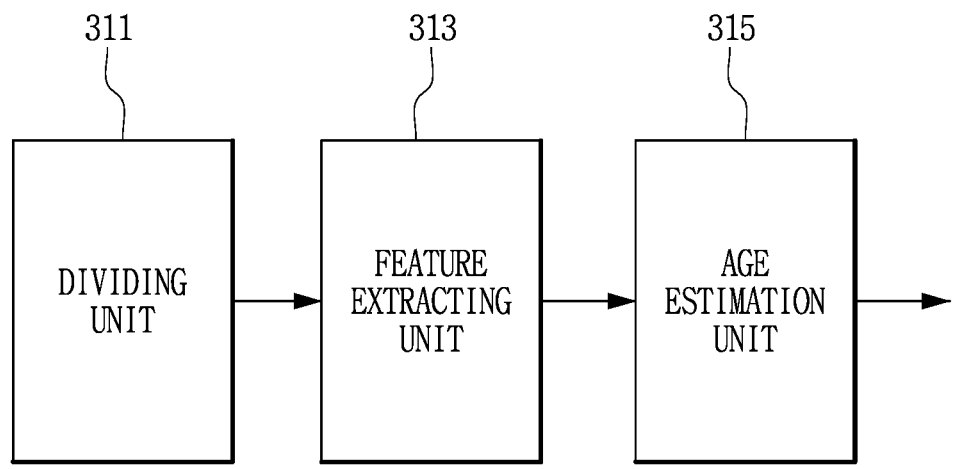
FIG. 2 is a detailed block diagram showing an age measuring unit, employed at the age simulation device of FIG. 1.
Figure 3:
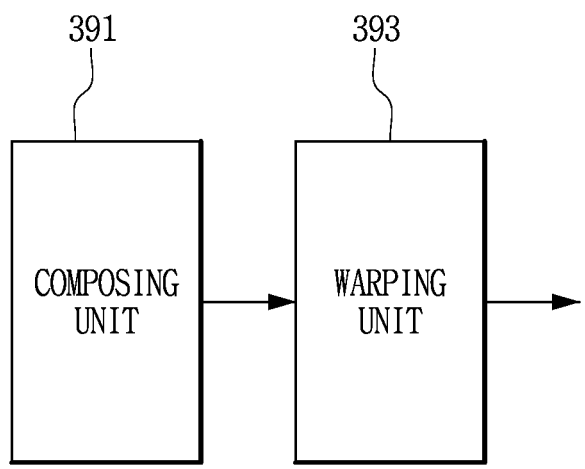
FIG. 3 is a detailed block diagram showing a simulation unit, employed at the age simulation device of FIG. 1.

FIG. 1 is a block diagram showing a device for age simulation (hereinafter, also referred to as an age simulation device) according to an embodiment of the present disclosure. FIG. 2 is a detailed block diagram showing an age measuring unit, employed at the age simulation device of FIG. 1. FIG. 3 is a detailed block diagram showing a simulation unit, employed at the age simulation device of FIG. 1.

An age simulation device 10 the present disclosure divides a face into various parts, transforms an age based on age information of each facial part, and transforms an age by using an environment factor which gives an influence while an age of each facial part is transformed.

Referring to FIG. 1, the age simulation device 10 according to the present disclosure includes an off-line unit 100 for building a database in an off-line process and training an environmental aging function and an on-line unit 300 for outputting an age-transformed image on the basis of a face image input through an on-line process.

The age simulation device 10 of the present disclosure may operate by executing software (application) installed therein for transforming an age based on the age of each facial part and environmental factors, and the off-line unit 100 and the on-line unit 300 may be controlled by the software executed by the age simulation device 10 for transforming an age.

The age simulation device 10 may be a separate terminal or a partial module of the terminal. In addition, components of the off-line unit 100 and the on-line unit 300 may be formed as an integrated module or at least one module. However, each component may also be formed as an individual module, contrary to the above.

The age simulation device 10 may be stationary or mobile. The age simulation device 10 may be in the form of server or engine, and may also be called a device, an apparatus, a terminal, user equipment (UE), a mobile station (MS), a wireless device, a handheld device or the like.

The age simulation device 10 may execute or produce various kinds of software on the basis of an operation system (OS), namely a system. The operation system is a system program for allowing software to use hardware of a device and may employ all kinds of mobile computer operation systems such as Android OS, iOS, Windows mobile OS, Bada OS, Symbian OS, Blackberry OS or the like and all kinds of computer operation systems such as Windows series, Linux series, Unix series, MAC, AIX, HP-UX or the like.

Hereinafter, each component of the age simulation device 10 will be described briefly, and details of the method for facial age simulation according to the present disclosure will be described later in detail with reference to FIG. 4.

The off-line unit 100 includes a database building unit 130 and a training unit 150. The off-line unit 100 may be formed as a module or device separate from the on-line unit 300 or may also be an integrated module or device together with the on-line unit 300.

The database building unit 130 collects face images, investigates various environmental factors such as health, body type, job, life habits, sex, race or the like of a person in each face image, and builds a database in which the face images are classified depending on environmental factors. Among the environmental factors, the life habit may include skin care, drinking, smoking, exercise, diet or the like. The environmental factor may be prepared by carrying a survey to the person in the face image or automatically investigated by collecting face images for a specific group classified by body type, job or the like.

The training unit 150 trains an age of each facial part and an environmental aging function by using the database. The aging function defines a relation among each facial feature, environmental information and age, and thus an age transformation model may be generated based on the age of each facial part and the environmental factor.

The on-line unit 300 includes an age measuring unit 310, an environment selecting unit 330, an age transforming unit 350, an image reconstructing unit 370 and a simulation unit 390.

The age measuring unit 310 measures an age of each facial part on the basis of an input face image. A face image of a human is composed of various components such as eyes, nose and lips as well as texture information, and various components have different aging procedures.

In addition, a human face is influenced by numerous environmental factors (health, job, life habits and so on) along with time, and thus an actual age is different from an age measured for each facial part. For example, when a person works mostly in the open air, the shape of the entire face of the person is transformed suitable for his/her age, but the skin may be aged faster due to the influence of ultraviolet rays.

Therefore, in an existing technique, an age is transformed based on the same age for all parts of the face, but in the present disclosure, an age is transformed based on an age measured for each facial part to reflect inherent features of a person.

Referring to FIG. 2, the age measuring unit 310 includes a dividing unit 311 for dividing an input face image into each facial part, a feature extracting unit 313 for extracting each facial feature, and an age estimation unit 315 for estimating an age from each facial feature.

The dividing unit 311 may divide and classify an input face image into each facial part (eyes, nose, lips, jaw, forehead, wrinkles, skin and so on).

The feature extracting unit 313 may extract a feature vector from each divided facial part. For example, features such as shape and texture of eyes, nose, lips or the like of the face may be extracted by means of a statistical analysis technique, and features such as wrinkle, skin or the like may be extracted by means of a frequency analysis-based filter or a local binary pattern analysis method.

The age estimation unit 315 may include a facial shape measuring unit for measuring an age of shape of eyes, nose, lips or the like of the face and a texture measuring unit for measuring an age of texture of eyes, nose, lips or the like of the face and texture of a part or all of wrinkle and skin.

In an embodiment, the age estimation unit 315 may train the extracted features and the age information by means of support vector regression (SVR) and then measure an age of each part. In addition, the age estimation unit 315 may utilize information collected by means of subjective assessment for experimenters as supplementary data.

In another embodiment, the age estimation unit 315 may use a separate module such as an age recognizer, a skin measurement sensor or the like.

The environment selecting unit 330 designates a personal environmental factor. The environment selecting unit 330 may designate at least one of personal health, body type, job, life habit, race and district. Among the environmental factors, the life habit may include skin care, drinking, smoking, exercise, diet or the like.

Such environmental factors may be selected based on data collected through a survey performed to a person in the face image.

The age transforming unit 350 transforms an age of each facial part by applying an age transformation model according to the age of each facial part and the environmental factor. At this time, the aging function trained by the training unit 150 of the off-line unit 100 may be used.

In detail, an age transformation model is trained using an aging function, and the aging function is applied based on the age information measured for each facial part. In addition, by using the database classified depending on environmental factors, an aging function of each environment is trained, and the age is transformed using the aging function suitable for the environmental factor of the input image.

When the age of each part is transformed, the age of shape and texture of each facial part (eyes, nose, lips, jaw, forehead, wrinkles, skin and so on) may be transformed.

For example, regarding wrinkles, features may be extracted by means of a frequency analysis-based filter and the age may be transformed by means of the aging function, and regarding the skin, features may be extracted by means of a local binary pattern analysis method and the age may be transformed by means of the aging function.

The image reconstructing unit 370 reconstructs the image transformed for each facial part. For example, the transformed image for shape and texture of eyes, nose, lips or the like of the face and each part of wrinkle and skin may be reconstructed using a reconstruction technique.

For example, the image may be reconstructed by referencing a local image table which is composed of winkle and skin feature vectors and skin image patches of training data. In addition, by using similarity of the wrinkle and skin features and the environmental factor, an image of each part may be reconstructed by selecting wrinkle and skin image patches from the local image table.

The simulation unit 390 generates an age-transformed face by composing the images reconstructed for each part by the image reconstructing unit 370 and outputs a resultant product.

Referring to FIG. 3, the simulation unit 390 may include a composing unit 391 for composing the reconstructed image with respect to shape and texture of each age-transformed facial part (eyes, nose, lips, jaw, forehead, wrinkles, skin and so on) and a warping unit 393 for coupling the composed image with the age-transformed facial shape for warping.

For example, the composing unit 391 may extract only wrinkles by using a wrinkle mask prepared with a frequency analysis-based filter, then compose the wrinkles with the age-transformed face texture, and generate a skin mask through binarization to compose only features such as freckles and speckles to the age-transformed face texture.

The warping unit 393 warps the age-transformed texture suitable for the age-transformed face to generate a final age-transformed face.

In another embodiment, the age simulation device 10 according to the present disclosure may further include a comparing unit for comparing the simulation result of the simulation unit 390, namely an age transformation result generated based on the age of each facial part and the environmental factor, with an age transformation result generated based on other environmental factor visually or by using the measured age of each facial part of both results.

In the present disclosure, an age of each facial part is measured, and then an age-transformed face is generated based thereon. Here, if an actual age is different from the measured age of each facial part, a realistic age transformation result may be obtained in comparison to an existing technique. In addition, in the method of the present disclosure, since an environmental factor (health, body type, job, life habits or the like) giving an influence on the process of transforming an age of each facial part is used together, a user-customized age transformation result may be obtained.

In addition, in the present disclosure, by comparing an age transformation result generated based on an age of each facial part and the environmental factor with an age transformation result generated based on other environmental factor visually or by using the measured age of each facial part of both results, it is possible to check personal environmental factors giving an influence on aging of a face and improve the personal environmental factors to inhibit the aging.

Figure 4:
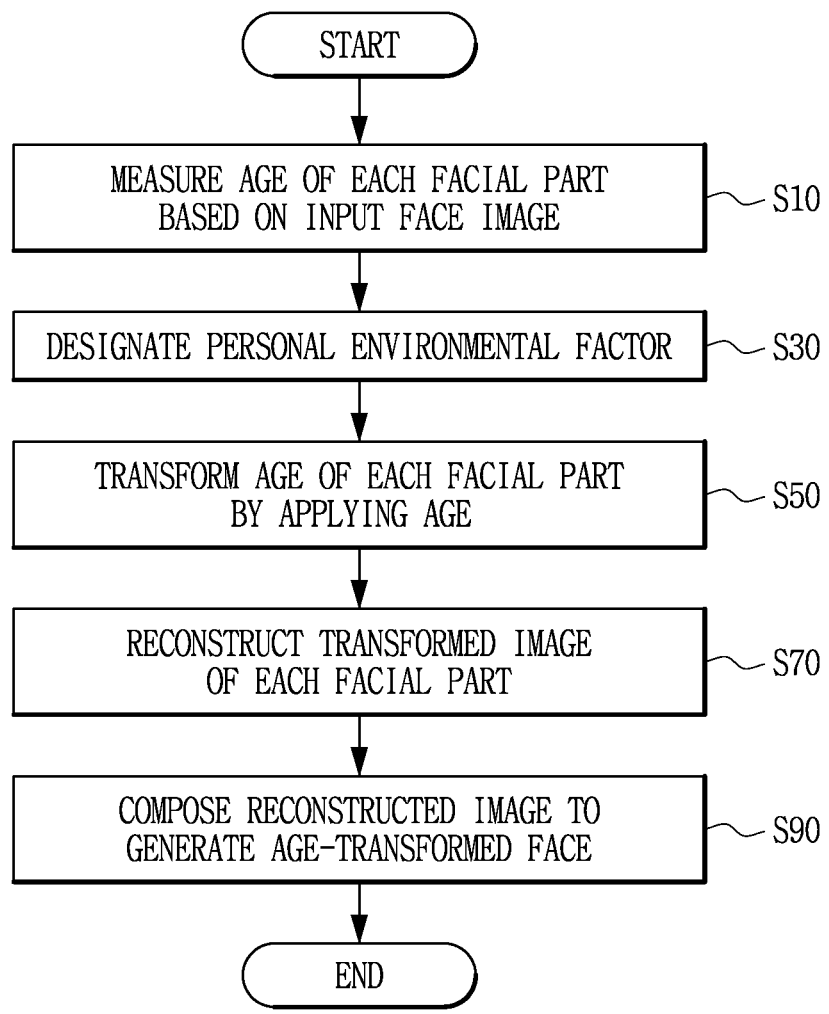
FIG. 4 is a flowchart for illustrating a method for facial age simulation according to an embodiment of the present disclosure.
Figure 5:
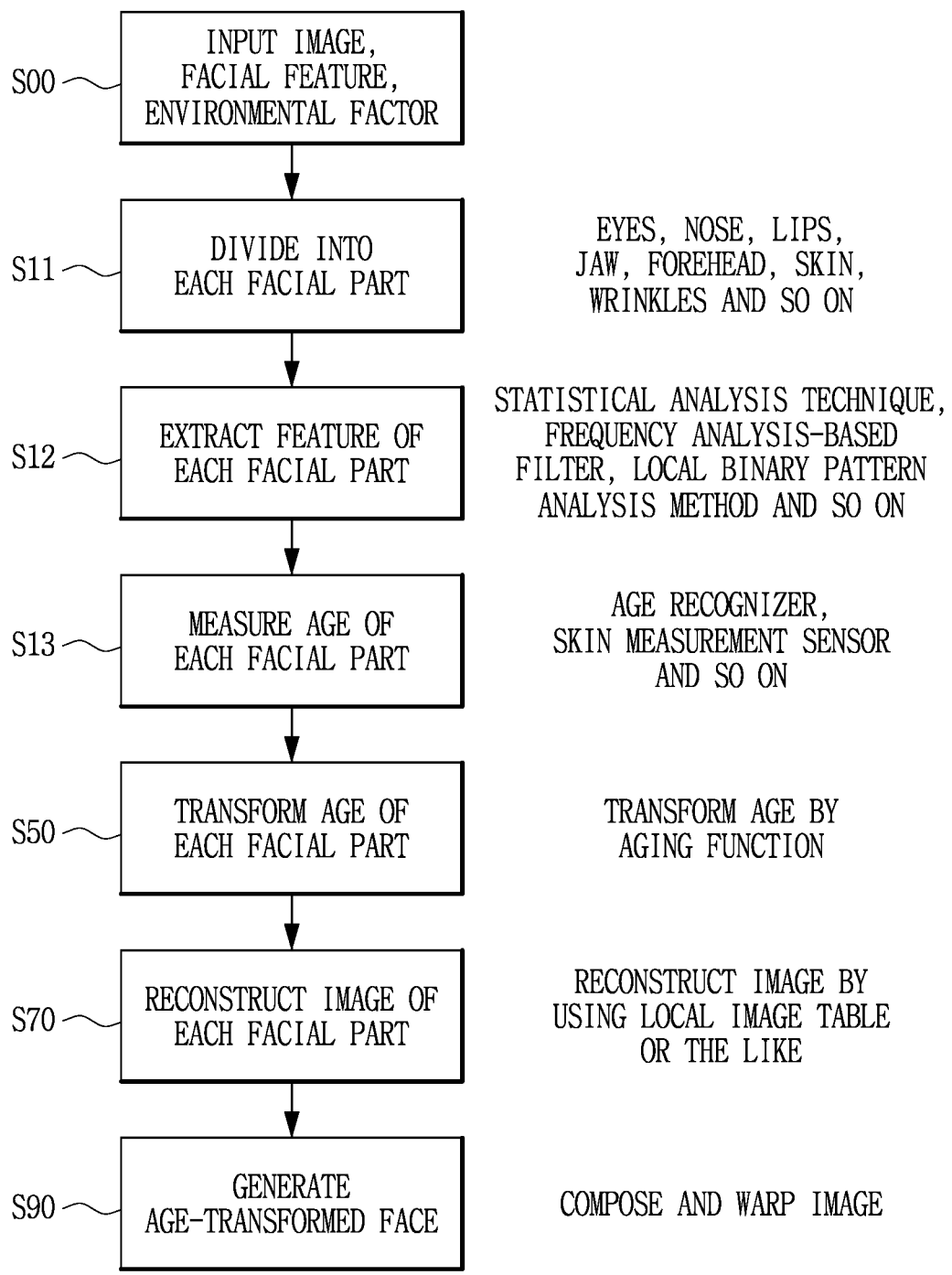
FIG. 5 is a detailed flowchart for illustrating the method for facial age simulation of FIG. 4.

FIG. 4 is a flowchart for illustrating a method for facial age simulation according to an embodiment of the present disclosure. FIG. 5 is a detailed flowchart for illustrating the method for facial age simulation of FIG. 4.

The method for facial age simulation according to this embodiment may be executed using substantially the same configuration as the age simulation device 10 of FIG. 1. Therefore, the same component as in the age simulation device 10 of FIG. 1 is denoted by the same reference numeral and not described in detail here. In addition, the method for facial age simulation according to this embodiment may be executed using software (application) for transforming an age based on the age of each facial part and environmental factors.

Referring to FIGS. 4 and 5, in the method for facial age simulation, a face image and an environmental factor are input, and then an age is transformed based thereon (S00).

First, an age of each facial part is measured based on the input face image (S10). A human face image is composed of shapes and textures of various elements such as eyes, nose, lips and so on, and these elements are aged differently. Therefore, in the existing technique, an age is transformed based on the year of user's birth, but in the present disclosure, an age is transformed based on personal inherent features by referencing the age measured for each facial part, rather than an actual age of the entire face.

The step of measuring an age of each facial part based on the input face image (S10) may include dividing the input face image into each facial part (S11), extracting each facial feature from each facial part (S12) and measuring an age from each facial feature (S13).

In the step of dividing the input face image into each facial part, the face image may be divided into shapes and textures of eyes, nose, lips, jaw, forehead, wrinkles, skin and so on (S11).

The step of extracting each facial feature may use at least one of a statistical analysis technique, a frequency analysis-based filter and a local binary pattern analysis method (S12).

In an embodiment, the statistical analysis technique may be used for shapes and textures of eyes, nose, lips or the like of the face, and the frequency analysis-based filter may be used for wrinkles, and the local binary pattern analysis method may be used for the skin.

Subsequently, an age with respect to shape and texture of each part (eyes, nose, lips, jaw, forehead, wrinkles, skin and so on) of the face is measured using the extracted features (S13).

In addition, since a human face is influenced by numerous environmental factors (health, job, life habits and so on) along with time, there is a difference in ages measured for each facial part and aging processes. For example, when a person works mostly in the open air, the shape of the entire face of the person is transformed suitable for his/her age, but the skin may be aged faster due to the influence of ultraviolet rays.

Thus, a personal environmental factor is designated (S30). For the personal environmental factor, at least one of personal health, body type, job, life habit, race and district may be designated. Among the environmental factors, the life habit may include skin care, drinking, smoking, exercise, diet or the like. Such environmental factors may be selected based on data collected through a survey.

After that, an age of each facial part is transformed by applying an age transformation model according to the age of each facial part and the environmental factor (S50).

Similarly, the age transformation step (S50) is also performed for shape and texture of each facial part (eyes, nose, lips, jaw, forehead, wrinkles, skin and so on).

The age transformation step (S50) may use the aging function which has been already trained. For this, face images are collected, various environmental factors such as health, body type, job, life habit, sex, race or the like of a person in each face image are investigated, and the face images are classified depending on environments to build a database. Among the environmental factors, life habit may include skin care, drinking, smoking, exercise, diet or the like. The environmental factor may be prepared by carrying a survey to the person in the face image or automatically investigated by collecting face images for a specific group classified by body type, job or the like.

By using the database, the aging function of the age of each facial part and each environment is trained. The aging function defines a relation among each facial feature, environmental information and age, and thus an age transformation model may be generated based on the age of each facial part and the environmental factor.

In detail, an age transformation model is trained using the aging function, and the aging function is applied based on the age information measured for each facial part. In addition, by using the database classified depending on environmental factors, an aging function of each environment is trained, and the age is transformed using the aging function suitable for the environmental factor of the input image.

When the age of each part is transformed, the age of shape and texture of each facial part (eyes, nose, lips, jaw, forehead, wrinkles, skin and so on) may be transformed.

For example, regarding wrinkles, features may be extracted by means of a frequency analysis-based filter and the age may be transformed by means of the aging function, and regarding the skin, features may be extracted by means of a local binary pattern analysis method and the age may be transformed by means of the aging function.

If the age of each facial part is completely transformed, the image transformed for each facial part is reconstructed (S70). For example, the transformed image for shape and texture of eyes, nose, lips or the like of the face and each part of wrinkle and skin may be reconstructed using a reconstruction technique.

Finally, the reconstructed images are composed to generate an age-transformed face (S90). In detail, the method includes a step of composing the reconstructed image with respect to shape and texture of each age-transformed facial part (eyes, nose, lips, jaw, forehead, wrinkles, skin and so on) and a step of coupling the composed image with the age-transformed facial shape for warping.

In addition, a step of comparing an age transformation result generated based on the age of each facial part and the environmental factor with an age transformation result generated based on other environmental factor visually or by using the measured age of each facial part of both results may be additionally included.

In this embodiment, the face image is divided into shapes and textures of eyes, nose, lips, jaw, forehead, wrinkles, skin and so on to extract features and transform an age. However, the divided elements may be further added, deleted or changed, as necessary.

In the present disclosure, a method for transforming an age in consideration of an age measured for each facial part and an environmental factor is proposed. Since an age is transformed using age information measured differently for each facial part and personal environmental information, a user-customized age transformation result may be obtained. Accordingly, an age-transformed face may be generated more accurately in comparison to an existing method. In addition, in the present disclosure, by comparing an age transformation result generated based on an age of each facial part and environmental factor with an age transformation result generated based on other environmental factor visually or by using the measured age of each facial part of both results, it is possible to check personal environmental factors giving an influence on aging of a face and improve the personal environmental factors to inhibit the aging.

The method for facial age simulation based on an age of each facial part and environmental factors as described above may be implemented as an application or program commands executable by various kinds of computer means and recorded on a computer-readable recording medium. The computer-readable recording medium may include program commands, data files, data structures or the like solely or in combination.

The program commands recorded on the medium may be specially designed or configured for the present disclosure or known to and available by computer software engineers.

The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like.

The program commands include not only machine codes made by a complier but also high-level language codes executable by a computer by using an interpreter. The hardware device may be configured to operate as at least one software module to perform the operations of the present disclosure, or vice versa.

In addition, even though the embodiments have been illustrated and explained, the present disclosure can be modified in various ways without departing from the scope of the claims by those having ordinary skill in the art, and such modifications must not be separately understood from the features of the present disclosure.

According to the report of Korean Health Industry Development Institute in 2014, the international cosmetic market is increasing with an annual average of 3.9%, nearly 249.5 billion dollars in 2013. In the present disclosure, an age-transformed face may be generated according to an age of each facial part of a consumer and an environmental factor and utilized for developing or recommending user-customized products, which may be usefully utilized in the cosmetic industries. In addition, since age transformation results before and after a functional cosmetic is used may be generated and compared, the present disclosure may be utilized for evaluating an effect of the cosmetic and efficiently advertising the corresponding product to consumers.

Further, in public social fields, the present disclosure may be utilized for searching a missing child, a long-term missing person or the like since a present look can be estimated more accurately from a past photograph.

What is claimed is:

1. A method for facial age simulation, the method comprising:
   extracting, via a processor, respective shapes of facial parts of an input face image of a person;
   estimating, via the processor, respective effective ages of the facial parts;
   designating, via the processor, personal environmental factors of the person;
   transforming, via the processor, the estimated respective effective ages by applying a transformation model based on the designated personal environmental factors;
   transforming, via the processor, the respective shapes based on the transformed respective effective ages;
   reconstructing, via the processor, the facial parts based on the transformed respective shapes;
   composing, via the processor, an aged face image based on the reconstructed facial parts;
   designating, via the processor, other personal environmental factors of the person;
   repeating for the designated other personal environmental factors, via the processor, the transforming of the estimated respective effective ages, the transforming of the respective shapes, and the reconstructing of the facial parts, to compose another aged face image; and
   generating, via the processor, a comparison of the composed aged face image with the composed another aged face image,
   wherein the transformed respective effective ages are different from each other.

2. The method of claim 1, wherein the estimating of the respective effective ages includes:
   dividing, via the processor, the input face image into each of the facial parts;
   extracting, via the processor, respective facial features from each of the facial parts; and
   estimating, via the processor, the respective effective ages of the facial parts respectively based on the extracted respective facial features.

3. The method of claim 2, wherein, in the estimating of the respective effective ages, the respective effective ages are measured with respect to the respective shapes and respective textures of each of the facial parts.

4. The method of claim 3, wherein, in the transforming of the respective effective ages, the transformation model further transforms the respective effective ages with respect to the respective textures.

5. The method of claim 4, wherein the composing of the aged face includes:
   composing, via the processor, the aged face image with respect to the respective textures that result from the transforming of the respective effective ages; and
   coupling, via the processor, the aged face image with an age-transformed facial shape for warping.

6. The method of claim 1, wherein the personal environmental factors include any one or any combination of any two or more of drinking, smoking, personal health, body type, job, race, and district.

7. The method of claim 1, further comprising:
   building, via the processor, a database in which face images are classified according to the personal environmental factors; and
   training, via the processor, an environmental aging function by using the database.

8. The method of claim 7, wherein the transforming of the respective effective ages is dependent on the environmental aging function.

9. The method of claim 8, wherein the environmental aging function defines a relationship between each of the facial parts, the personal environmental factors, and the respective effective ages.

10. The method of claim 1, wherein the generating of the comparison comprises generating the comparison visually.

11. A non-transitory computer-readable medium storing instructions that, when executed by a processor, cause the processor to perform the method of claim 1.

12. The method of claim 1, wherein the estimated respective effective ages are different from each other.

13. The method of claim 12, wherein at least one of the estimated respective effective ages is different from an age of the person that appears in the input face image.

14. The method of claim 1, wherein the facial parts that are in the aged face image appear to have aged by different extents.

15. A device for facial age simulation, the device comprising: a processor configured to:
   extract respective shapes of facial parts of an input face image of a person;
   estimate respective effective ages of the facial parts;
   designate personal environmental factors of the person;
   transform the estimated respective effective ages by applying a transformation model based on the designated personal environmental factors;
   transform the respective shapes based on the transformed respective effective ages;
   reconstruct the facial parts based on the transformed respective shapes;
   compose an aged face image based on the reconstructed facial parts;
   designate other personal environmental factors of the person;
   repeat for the designated other personal environmental factors the transformation of the estimated respective effective ages, the transformation of the respective shapes, and the reconstruction of the facial parts, to compose another aged face image; and
   generate a comparison of the composed aged face image with the composed another aged face image, wherein the transformed respective effective ages are different from each other.

16. The device of claim 15, wherein the processor is further configured to:
   divide the input face image into each of the facial parts;
   extract respective facial features from each of the facial parts; and
   estimate the respective effective ages from the extracted respective facial features.

17. The device of claim 16, wherein the processor is further configured to:
   estimate the respective effective ages with respect to the respective shapes and respective textures of each of the facial parts.

18. The device of claim 17, wherein the processor is further configured to transform the respective effective ages with respect to the respective shapes and the respective textures.

19. The device of claim 18, wherein the processor is further configured to:
   compose the input face image with respect to the respective textures, which result from the transformation of the respective effective ages; and couple the composed aged face image with an age-transformed facial shape for warping.

20. The device of claim 16, wherein, for the estimation of the respective effective ages, the processor is further configured to use either one or both of an age recognizer and a skin measurement sensor.

21. The device of claim 15, wherein the personal environmental factors include any one or any combination of any two or more of drinking, smoking, a-personal health, body type, job, race, and district.

22. The device of claim 15, wherein the processor is further configured to:
   build a database in which face images are classified according to the personal environmental factors; and
   train an environmental aging function by using the database.

23. The device of claim 22, wherein the transformation of the respective effective ages is dependent on the environmental aging function.

24. The device of claim 15, wherein the processor is further configured to generate the comparison visually.

* * * * *